US006759814B2

(12) United States Patent
Vogel et al.

(10) Patent No.: US 6,759,814 B2
(45) Date of Patent: Jul. 6, 2004

(54) ILLUMINATOR AND METHOD OF MAKING SAME

(75) Inventors: Richard M. Vogel, Pittsford, NY (US); Erin S. Wanek, Webster, NY (US); James M. Enge, Spencerport, NY (US); Bruce H. Pillman, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 10/108,975

(22) Filed: Mar. 28, 2002

(65) Prior Publication Data

US 2003/0185004 A1 Oct. 2, 2003

(51) Int. Cl.[7] .............................................. H05B 37/00
(52) U.S. Cl. ...................... 315/312; 362/545; 362/800; 358/475; 358/509
(58) Field of Search ................................ 358/475, 509, 358/510, 512, 513; 315/244 P, 149, 151, 291, 307, 312; 348/223, 224, 227; 362/231, 497, 800, 545

(56) References Cited

U.S. PATENT DOCUMENTS

| 5,668,596 | A |   | 9/1997  | Vogel ........................... 348/222 |
| 5,896,014 | A | * | 4/1999  | Ogawa et al. ............. 315/241 P |
| 5,982,957 | A |   | 11/1999 | DeCaro et al. ............... 382/312 |
| 6,127,783 | A |   | 10/2000 | Pashley et al. .............. 315/149 |
| 6,205,244 | B1 |   | 3/2001  | Bawolek et al. ............. 382/162 |
| 6,329,764 | B1 | * | 12/2001 | van de Ven ................. 315/291 |
| 6,400,099 | B1 | * | 6/2002  | Walker ........................ 315/291 |
| 6,523,976 | B1 | * | 2/2003  | Turnbull et al. ............. 362/231 |

FOREIGN PATENT DOCUMENTS

EP 0 456 343 A1 3/1991

OTHER PUBLICATIONS

"Measuring Colour," by R.W.G. Hunt, 1987, Section 2.4 and 3.3.
A Guide to Integrating Sphere Radiometry and Photometry, published by Labsphere, Inc., PO Box 70, North Sutton, NH 03260.
Web Site: www.gamma-sci.com, Photometric Calibration, Radiometric Calibration, CCD, CMOS, . . .
Web site: www.testandmeasurement.com.

* cited by examiner

Primary Examiner—Haissa Philogene
(74) Attorney, Agent, or Firm—Clyde E. Bailey, Sr.

(57) ABSTRACT

An illuminator suitable for accurate colorimetric work in electronic imaging and traditional photograghic environments uses an integrating chamber, a plurality of light emitting diodes (LEDs) and a controller for controlling the emitted energy form the LED. An LED support member assures that the beam of energy will be directed along a predetermined path between the energy inlet end and energy outlet end of the integrating chamber. Energy of a predetermined wavelength is filtered from entering the integrating chamber.

26 Claims, 9 Drawing Sheets

ILLUMINATOR AND METHOD OF MAKING SAME

CROSS-REFERENCE TO RELATED APPLICATIONS

The present application is related to U.S. application Ser. No. 10/109,221, filed Mar. 28, 2002, by Richard M. Vogel, et al., and entitled, "System And Method For Calibrating An Image Capture Device".

FIELD OF THE INVENTION

The invention relates generally to the field of illuminators suitable for accurate calorimetric work in electronic imaging and traditional photographic design and production environments. More particularly, the invention concerns illuminators using solid-state emitters and having independent control of both the output spectral characteristic and power level.

BACKGROUND OF THE INVENTION

Illumination sources are used in the digital still camera (DSC) development and production environments to support a number of different tests and/or calibrations. For example, it is usually necessary to set the relative gains of the DSC's various color channels to achieve equal channel responses for a given illuminant color temperature. This procedure is often referred to as "white-balancing" the camera. It is important to use an illumination source during this adjustment procedure that accurately mimics the spectral characteristics of the illumination condition under which the camera will actually be used. Examples of white-balance settings that may be selectable on a DSC are daylight, fluorescent, tungsten, and flash. The term 'illuminator' and 'illumination source' will be used interchangeably throughout this document and should be understood to mean the same thing.

In addition to accurately reproducing a particular illumination spectral power distribution (SPD) characteristic, an illuminator may also be called upon to provide an adjustable output level which does not, in turn, impact the spectral shape of the output. Some examples of the need for this capability are the testing or calibration of a DSC exposure control system or the mapping of the linearity of an imager or DSC tone-scale. This capability is also useful for determining the density versus log-exposure characteristic of photographic films. Usually, the only way to adjust the output level of traditional illumination sources, without changing their spectral shape, is to employ either an adjustable mechanical aperture or a series of selectable neutral-density filters.

Illuminators are used in conjunction with either reflective or transmissive types of color charts to perform calorimetric calibration of a DSC. This procedure requires not only an illuminator with a high-quality spectral output but one whose output spectral characteristics are stable over time. In addition, the spectral characteristics of the color chart must also be stable over time Unfortunately, the aging characteristic of most lamps requires frequent illuminator recalibration in order to maintain accurate results. Physical color charts are often expensive to fabricate and suffer from fading effects that require periodic re-measurement. In addition, it is sometimes difficult to provide uniform illumination over an entire chart and this non-uniformity will impact the DSC calibration. It will be shown later that the present invention allows the color chart to be eliminated entirely, thereby reducing costs and improving calibration accuracy.

One popular illuminator technology is the quartz-tungsten-halogen (QTH) lamp. QTH illuminators typically operate at a color temperature between 2800 and 3200 Kelvins although higher color temperatures can be achieved by a QTH illuminator using appropriate color conversion filters between the illuminator and the DSC. The QTH illuminator is popular because of its relatively low cost and it's smooth spectral characteristic. Unfortunately, the QTH lamp technology also has many disadvantages. QTH lamps age quickly and must typically be replaced at intervals ranging from 40 to 200 hours depending on how the lamp is operated. Calibration of the lamp must be checked frequently, usually once or twice a day in a production environment, to ensure consistent product quality. QTH lamps also output a significant amount of energy in the infra-red (IR) region and this requires the use of expensive, heat resistant glass filters to block this unwanted energy from the illuminator output.

Halide-metal-iodide (HMI) and xenon lamps are a popular choice for simulating daylight illumination because of their higher correlated-color temperatures. These lamp types also suffer the disadvantages of aging and high output in the form of IR and heat. Both lamp types exhibit some amount of discrete line spectra that may be objectionable for some applications. Xenon lamps also suffer from "arc wander" which can affect spatial and temporal uniformity of the illuminator output.

Fluorescent lamps are available with correlated-color temperature ratings suitable for simulation of indoor incandescent as well as outdoor lighting conditions and exhibit a useful life of several thousand hours. One of the disadvantages of fluorescent lamps is the discrete line structure introduced into the SPD characteristic by the Mercury vapor used to excite the phosphors. The mercury line structure is modulated by the AC waveform of the lamp drive current and this can cause a potentially undesirable variation in temporal output of the lamp.

All of the illumination technologies described thus far require a warm up period before their output characteristics stabilize and, typically, this warm up period is on the order of 30 minutes. Even fluorescent lamps, which ignite quickly, require that the glass envelope reach a certain temperature for optimum operation. Because of this warm up characteristic, these types of illuminators must be left in the on-state and a shutter mechanism must be used in conjunction with the illuminator to perform DSC or imager measurements in the dark. The shutter mechanism can be quite expensive when it is also required to accurately control the exposure time on the device or film under test.

In recent years, light-emitting diode (LED) technology has advanced to the point where these devices are now a viable alternative to the traditional illumination technologies used in many applications. LEDs exhibit a turn-on time on the order of 100 nanoseconds, obviating the need for a separate shutter mechanism. Furthermore, because of their stable spectral characteristics, LEDs can be used in conjunction with pulse-width modulation (PWM) to accurately vary output level, thereby eliminating the need for neutral density filters. Appropriate application of PWM to a set of LEDs having a plurality of different peak wavelengths allows the synthesis of different SPDs, thereby eliminating the need for conversion filters.

U.S. Pat. No. 6,127,783 issued Oct. 3, 2000 to Pashley et al., and entitled, "LED Luminaire With Electronically Adjusted Color Balance," describes a luminaire constructed from red, green, and blue LEDs to produce light of different colors based on the mixing together of suitable amounts of the three LED types. The Pashley method relies on the tri-chromatic color theory wherein three color "primaries" with suitable chromaticities in the Commission Internationale De L'Eclairage (CIE) x-y chromaticity diagram are used to create any color whose chromaticity falls within the triangular gamut defined by the chromaticities of the three primaries. A good discussion of tri-chromatic theory and use of the CIE chromaticity diagram can be found in the book *Measuring Colour* by R. W. G. Hunt (ISBN 0-470-20986-0) in sections 2.4 and 3.3, respectively. Pashley controls the current through the individual LED color channels to adjust the luminous output of each color channel and this has the desired effect of changing the chromaticity of the overall color mixture. The Pashley method suffers from a number of drawbacks when considered in the context of DSC or imager testing and calibration. First, the use of three narrow-band primaries, such as those produced by LEDs, may be inadequate for critical DSC calorimetric calibration because the DSC cannot discern colors in the same way as the human visual system does. This problem arises due to the fact that the spectral sensitivities of the DSC are not color-matching functions (CMFs), i.e. they are not directly related to the spectral sensitivities of the human visual system. During DSC calorimetric calibration, it is therefore important to present the DSC with the actual SPDs of important colors such as grass, skin tones, blue sky, etc. instead of just any SPD which produces the same chromaticity for these colors. It is well known to those skilled in the art of Color Science that a particular chromaticity can be achieved by any one of an infinite number of different SPDs, therefore, the setting of a particular chromaticity using this method does not guarantee the desired SPD for a particular color. The relationship between the LED intensity and forward current is often linear over a reasonable range of operating current so that current control would seem to be an obvious method for adjusting the LED output. Unfortunately, the spectral characteristics of an LED change slightly as a function of forward current making this an unacceptable control method for critical applications.

Another existing illumination development is manufactured by Gamma Scientific, located at 8581 Aero Drive in San Diego, Calif. Gamma Scientific produces a model RS-5 Digital Light Source System™ which is based substantially on the method taught by Pashley. The minimum configuration of the RS-5 utilizes a single model 42200 series LED optical head which comprises a plurality of LEDs of a single type as well as a model 21750 power supply/controller. The minimum RS-5 system varies the optical output power by varying the current supplied to the LEDs. A photodiode feedback circuit, built in to the optical head, is used in conjunction with calibration data to ensure an accurate output level. Gamma Scientific also produces a system comprising four RS-5 systems as described above. Each of the RS-5 systems has a different LED wavelength, in conjunction with a 12-inch integrating sphere for combining the optical outputs from the four LED heads and a personal computer with control software for mixing the primaries according to the user's desire. It is this latter configuration that allows for the implementation of the Pashley method except with four primaries instead of three.

Further, Gamma Scientific has begun marketing the model RS-5M Programmable Color-Tunable Source™ in addition to the previously described RS-5 Digital Light Source System™. This system comprises an integrating cavity that accepts up to eight standard LED optical heads and a companion control box. One potential drawback to this system is the expense of using the individual LED optical heads. Another potential drawback is the use of too few LED wavelengths to ensure a good spectral match when synthesizing a desired SPD.

U.S. Pat. No. 6,205,244 issued Mar. 20, 2001 to Bawolek, et al., and entitled, "Method For Imager Device Color Calibration Utilizing Light-Emitting Diodes Or Other Spectral Light Sources," describes several methods of using a plurality of LEDs to colorimetrically calibrate an image capture device. The Bawolek method of most relevance to the present invention involves controlling the relative output power of each of the individual LEDs in order to synthesize the resulting CIE XYZ tristimulus values for each color patch of a Macbeth Color Checker® under CIE illuminant D65. This is similar to the Pashley method except that more than three primaries are used. Each CIE XYZ triplet as used by Bawolek can be mathematically transformed to a corresponding CIE x-y chromaticity as used by Pashley. The Bawolek method suffers from the same potential problem as the Pashley approach in that the goal is to use the LEDs to synthesize the same XYZ tristimulus value (or x-y chromaticity) for each color patch as would have been obtained from the actual color patch illuminated by CIE illuminant D65. This approach does not guarantee that the SPD for each color patch/illuminant combination will be accurately simulated by the LEDs and the resulting colorimetric calibration will be tainted by the effects of metamerism due to differences between the DSC spectral sensitivities and those of the human visual system.

U.S. Pat. No. 5,982,957 issued Nov. 9, 1999, to Decaro et al., and entitled, "Scanner Illumination," describes the construction of an LED illumination system for a film scanner based on the use of a plurality of sets of LEDs having many different wavelengths. In one embodiment, the LEDs are mounted to a single circuit board which is affixed to a concentrator cone which, in turn, is part of a spherical integrating cavity. The purpose of the concentrator cone is to guide the optical energy from the LEDs into the integrating cavity. In another embodiment, multiple circuit boards and companion concentrator cones are used in conjunction with a spherical integrating cavity. The control method for mixing the individual LED channel outputs uses pulse-width modulation with the LEDs operating at a fixed, predetermined current when they are in the on state. This method ensures that the SPD characteristics of the LEDs remain constant. Decaro introduces the concept of spectral matching versus chromaticity matching in order to compensate for the unique characteristics of different manufacturer's film types. Although the DeCaro spectral matching approach is preferred for use in testing and calibration of image capture devices, he has restricted it's scope of application to film scanners alone. Use of a concentrator cone to direct the LED energy into the integrating cavity suffers from a couple of drawbacks which are overcome by the current invention. In particular, the physical size required by the concentrator cone prevents a compact illuminator design and the concentrator cone allows first-strike energy which enters the integrating cavity to hit almost everywhere within the cavity thereby reducing the uniformity of the illuminator output.

Therefore, a need persists in the art for an illuminator and method of making same that provides for independent control of spectral characteristics and power level for accurate calibration of image capturing devices.

SUMMARY OF THE INVENTION

It is, therefore, an object of the present invention to provide an illuminator for accurate testing and calibration of image capture devices.

It is another object of the invention to provide an illuminator that displays independent control of both output spectral characteristics and power level.

It is yet another object of the invention to provide an illuminator that eliminates the requirement of warm-up time prior to use.

Still another object of the invention is to provide a method of making an illuminator that enables accurate testing and calibration of image capturing devices.

To accomplish these and other objects, features, and advantages of the invention, there is provided, in one aspect of the invention, an illuminator comprising an integrating chamber having a first port for receiving energy and a second port arranged for transmitting energy received through the first port. Energy emitting means is arranged in the first port for directing a beam of energy into the integrating chamber. The energy emitting means is supported so that emitted energy is directed along a predetermined optical path in the integrating chamber. Means for filtering energy of a predetermined wavelength is arranged between the energy emitting means and the integrating chamber. A controller is operably associated with the energy emitting means for receiving user commands and then transmitting the user commands to the energy emitting means thereby enabling the energy emitting means to controllably emit energy.

In another aspect of the invention, a method of making an illuminator includes the step of providing an integrating chamber having a first port for receiving energy and a second port arranged for transmitting energy received through the first port. Energy emitting means are arranged in the first port for directing a beam of energy into the integrating chamber. The energy emitting means are supported so that emitted energy is directed along a predetermined optical path in the integrating chamber. Energy of a predetermined wavelength is filtered from entering the integrating chamber by use of a filtering means. A controller operably associated with the energy emitting means receives user commands and then transmits the user commands to the energy emitting means thereby enabling the energy emitting means to controllably emit energy.

The present invention, therefore, has numerous advantages over current developments, including: lower operating costs associated with the use of solid state emitting means that further obviates the need for frequent bulb replacements; the elimination of frequent calibrations since the spectral characteristics of the LED emitters are stable; the ability to vary the spectral characteristics and power level according to the needs of the source; and, the elimination of the need for a physical color target in order to calibrate the image capturing device.

BRIEF DESCRIPTION OF THE DRAWINGS

The above and other objects, features, and advantages of the present invention will become more apparent when taken in conjunction with the following description and drawings wherein identical reference numerals have been used, where possible, to designate identical features that are common to the figures, and wherein.

DETAILED DESCRIPTION OF THE INVENTION

Figure 1:
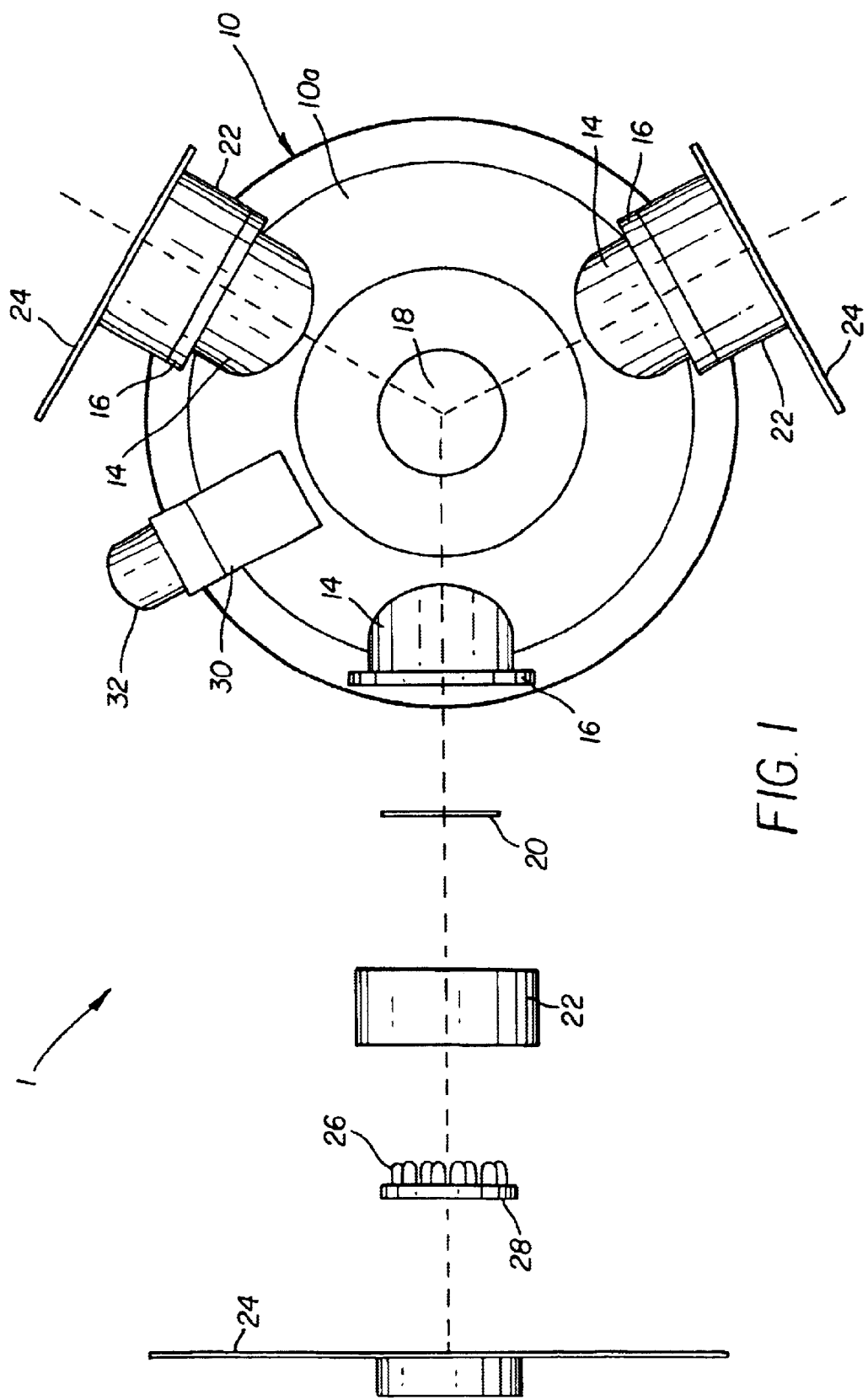
FIG. 1 is a bottom view of the LED illuminator looking into the exit port of the spherical integrating cavity and having an exploded view of the components attached to one of the entrance ports.
Figure 2:
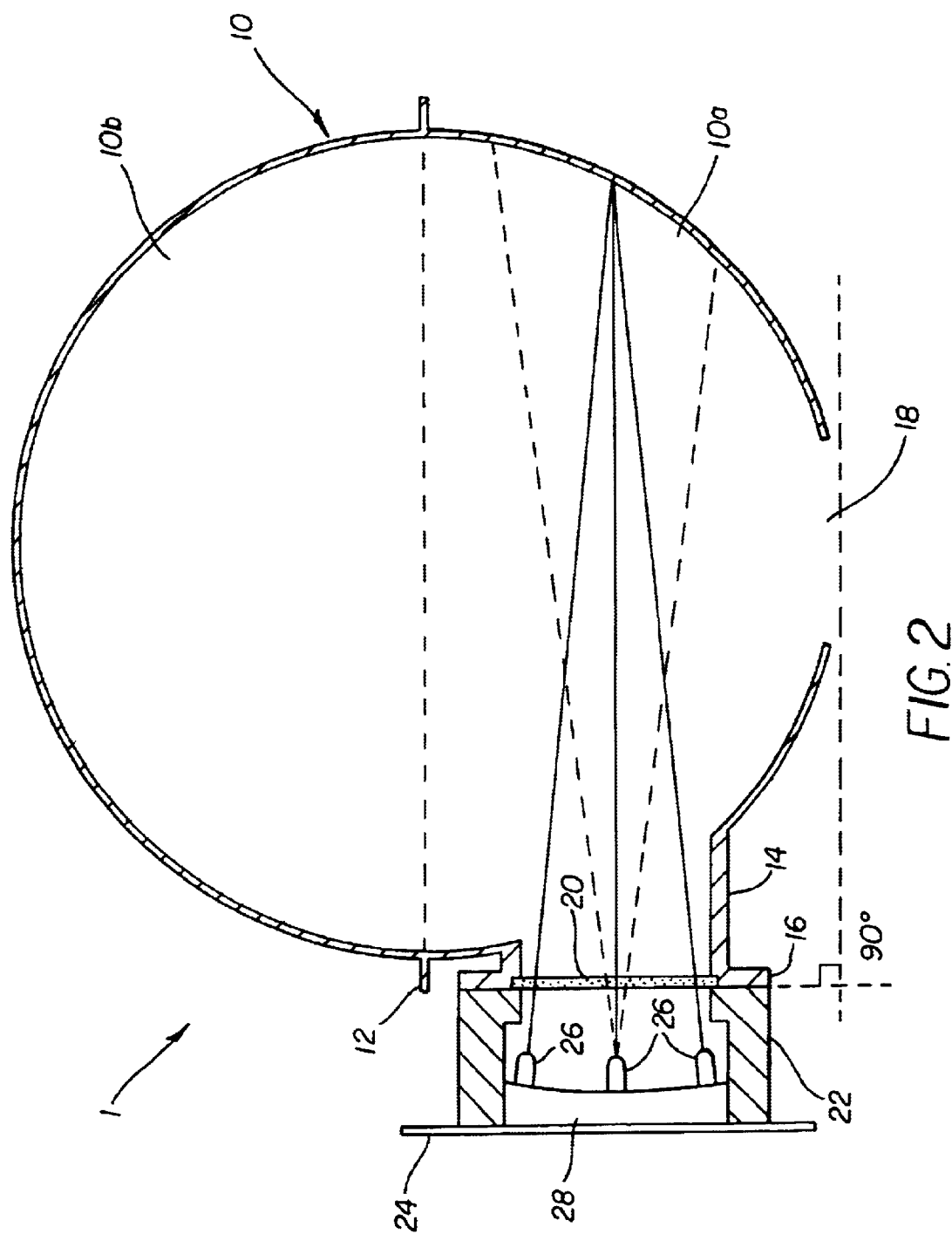
FIG. 2 is a side cutaway view of the LED illuminator.

Turning now to the drawings, and particularly to FIGS. 1 and 2, the illuminator 1 of the invention is illustrated. As shown, illuminator 1 includes an integrating chamber 10, preferably spherically shaped. Although not essential to the invention, integrating chamber 10 has a lower hemisphere 10a and an upper hemisphere 10b (shown in FIG. 2) coupled together by a hemisphere-coupling ring 12. An energy exit port 18 is located in a medial portion of the lower hemisphere 10a. A plurality of energy entrance ports 14 are arranged symmetrically around the energy exit port 18 on the lower hemisphere 10a. Energy exit port 18 comprises a plurality of energy exit openings. At least one of said exit openings serves as the main exit to supply radiant energy to the user's test environment. At least one additional said exit opening provides a portion of the radiant energy to a monitoring device such as a photodiode or a spectroradiometer. Ports 14 and 18 are arranged such that the planes of the entrance port mounting flanges 16 are normal to the plane of the energy exit port 18. Preferably, an odd number of energy entrance ports 14 helps to ensure that the energy which enters the spherical integrating chamber 10, does not exit through one of the other energy entrance ports 14 by guaranteeing that no two energy entrance ports 14 are diametrically opposed from each other. Although the preferred embodiment is described with reference to the use of three energy entrance ports 14, it will be understood to those skilled in the art that the present invention is not limited to the use of three energy entrance ports 14.

According to FIG. 2, a plurality of energy emitting means, preferably light emitting diodes (LEDs) 26, are arranged in energy entrance ports 14 for directing a beam of radiant energy into the integrating chamber 10. It is important to the invention that LEDs 26 have suitable individual spectral characteristics. In this embodiment, a set of LEDs 26 is arranged in an LED driver circuit board 24. The preferred embodiment uses LEDs 26 in an industry-standard T 1¾ (5 mm diameter) style package having a full emission angle of preferably 15 degrees or less. Depicted in the Table below are representative LED manufacturers and model numbers for the LEDs 26 used in the present invention. However, it will be understood to those skilled in the art that the present invention is not limited to the use of these specific devices alone.

TABLE 1

Summary of LEDs used in present invention

| Manufacturer | Model Number | Color |
|---|---|---|
| Infineon | LB-5416R | Blue |
| Nichia | NSPB500S-xx | Blue |
| Nichia | NSPE590S-xx | Blue-Green |
| Nichia | NSPG500S-xx | Green |

TABLE 1-continued

Summary of LEDs used in present invention

| Manufacturer | Model Number | Color |
|---|---|---|
| Toshiba | TLPGE-183P-S | Green |
| Toshiba | TLGE-183P-UV | Green |
| Agilent | HLMP-EL17-xxxxx | Yellow |
| Agilent | HLMP-EJ17-xxxxx | Orange |
| Agilent | HLMP-EH17-xxxxx | Red-Orange |
| Agilent | HLMP-EG17-xxxxx | Red |
| Marktech | MT3200A-UR | Red |
| Marktech | MT80F-UR | Red |

Referring again to FIGS. 1 and 2, a filtering means, preferably an infra-red (IR) filter 20, is positioned in each entrance-port mounting flange 16 to prevent unwanted IR energy from the LEDs 26 from entering the spherical integrating chamber 10. The IR filters 20 also prevent contaminants such as dust from entering the spherical integrating chamber 10 A circuit board coupler 22 provides a means of attaching the LED driver circuit boards 24, containing the LEDs 26, to the entrance port mounting flanges 16 of the illuminating chamber 10. The circuit board couplers 22 also serve to retain the IR filters 20 in the entrance port mounting flanges 16 and have holes around their circumference to allow for convection cooling of the LEDs 26.

With reference to FIG. 2, a concave LED aiming block 28 serves to direct the output of the LEDs 26 such that their optical axes converge on the interior wall of the lower hemisphere 10a directly opposite each energy entrance port 14. Reflected energy from the walls of the lower hemisphere 10a produces a substantially uniform radiance distribution from the upper hemisphere 10b after many reflections within the spherical integrating chamber 10. This approach also ensures that output of illuminator 1 is also spectrally uniform. A discussion of the use of spherical integrating cavities for uniform light source applications can be found in *A Guide to Integrating Sphere Radiometry and Photometry*, published by Labsphere, Incorporated, PO Box 70, North Sutton, N.H. 03260.

Figure 3:
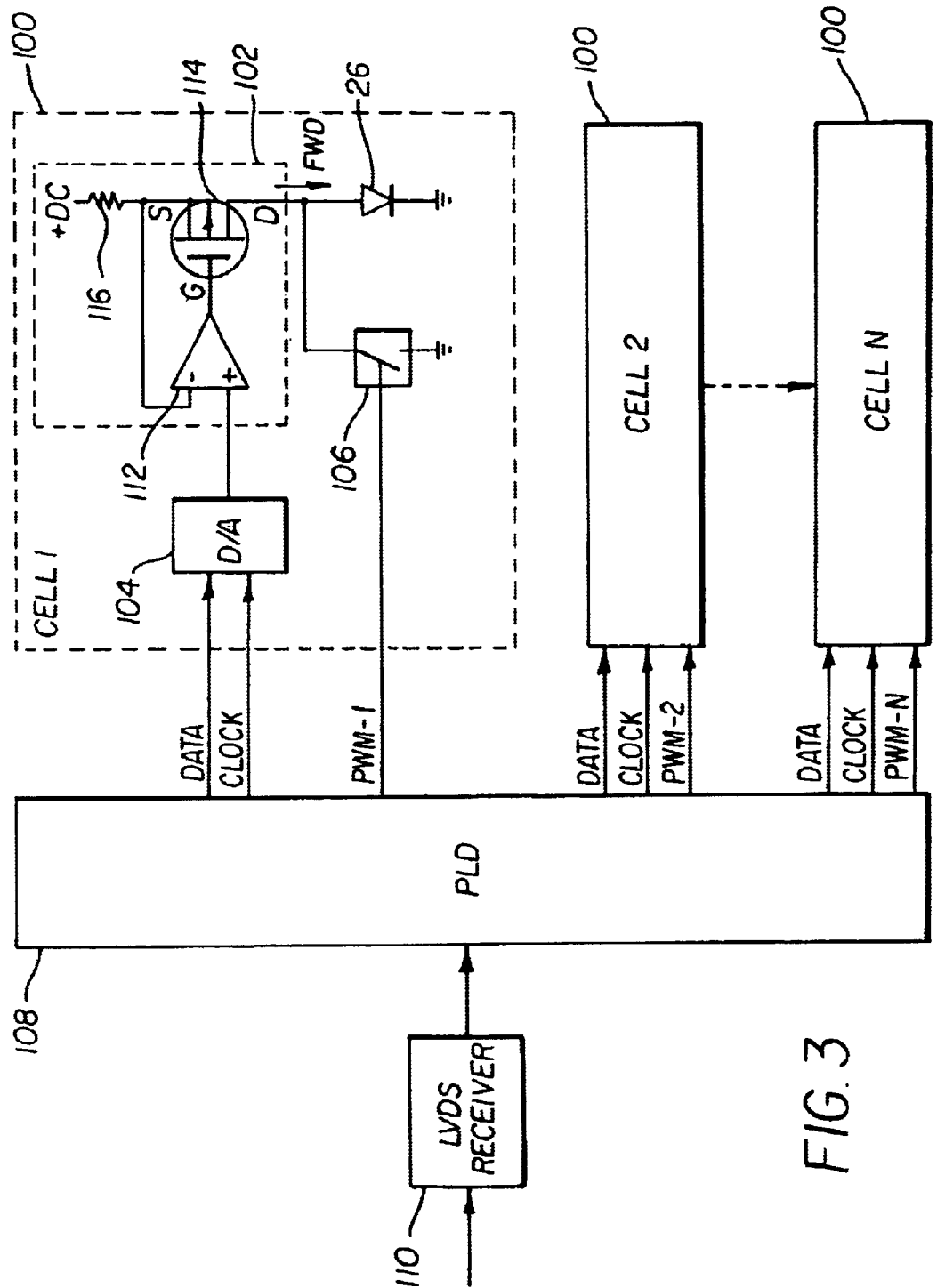
FIG. 3 is a functional block diagram of the circuitry included on one of the three identical LED driver boards.

Referring to FIG. 3, each LED driver circuit board 24 contains suitable means, herein referred to as cells 100, for driving each of the individual LEDs 26. Preferably, a plurality (N) of cells 100 for each LED driver circuit board 24 corresponds to the plurality of LEDs 26 present. Each cell consists of a constant current source 102 whose operating current may be set by means of a digital-to-analog (D/A) converter 104. A switch 106 allows the forward current ($I_{FWD}$) to be shunted around the LED 26 when it is desired to turn the LED off. The forward current for a particular LED 26 is selected whenever the LED illuminator is calibrated and that current setting is used during subsequent operation of the illuminator to ensure that the spectra of the individual LEDs 26 do not vary during use. In the preferred embodiment, the D/A converter 104 is one channel of a TrimDAC® such as part number AD8804, manufactured by Analog Devices Inc.

Referring still to FIG. 3, a preferred constant current source 102 uses an OP-AMP 112 with the positive terminal connected to the D/A converter 104 output. A P-channel MOSFET transistor 114 serves as the current regulating element with the gate connected to the OP-AMP 112 output, the drain connected to the LED 26 anode and the source connected to a resistor 116 which, in turn, is connected to a regulated DC power supply. The negative input of the OP-AMP 112 is connected to the source terminal of the MOSFET transistor 114. Current regulation is accomplished by setting the voltage drop across the resistor 116, which is in series with the source terminal of the MOSFET transistor 114, by means of the D/A converter 104. When the LED 26 is desired to be in the on-state, the switch 106 is left open as shown in FIG. 3 and, conversely, when the LED is desired to be in the off-state the switch 106 must be closed to shunt the forward current around the LED 26. In the preferred embodiment, the switch 106 is one channel of an open-collector TTL driver integrated circuit (IC) such as part number 74LS06, which is capable of sinking up to 40 milliamperes (mA). For lower values of LED current, it may be possible to use the open-drain output of the programmable logic device (PLD) 108 directly to implement the switch 106 function. Control signals for each of the N cells 100 are provided by the PLD 108. A pulse-width-modulation (PWM) signal from the PLD 108 controls the on-time of the LED 26 via switch 106. Commands, data, and clock signals are received by the LED driver circuit board 24 from the controller 200 (shown in FIG. 4, as described below) via a low-voltage differential signaling LVDS receiver circuit 110. Although the present invention has been described with reference to a preferred embodiment, those skilled in the art will agree that other suitable circuit elements may be substituted for the constant-current source 102, D/A converter 104 and switch 106 within the spirit and scope of this invention.

Figure 4:
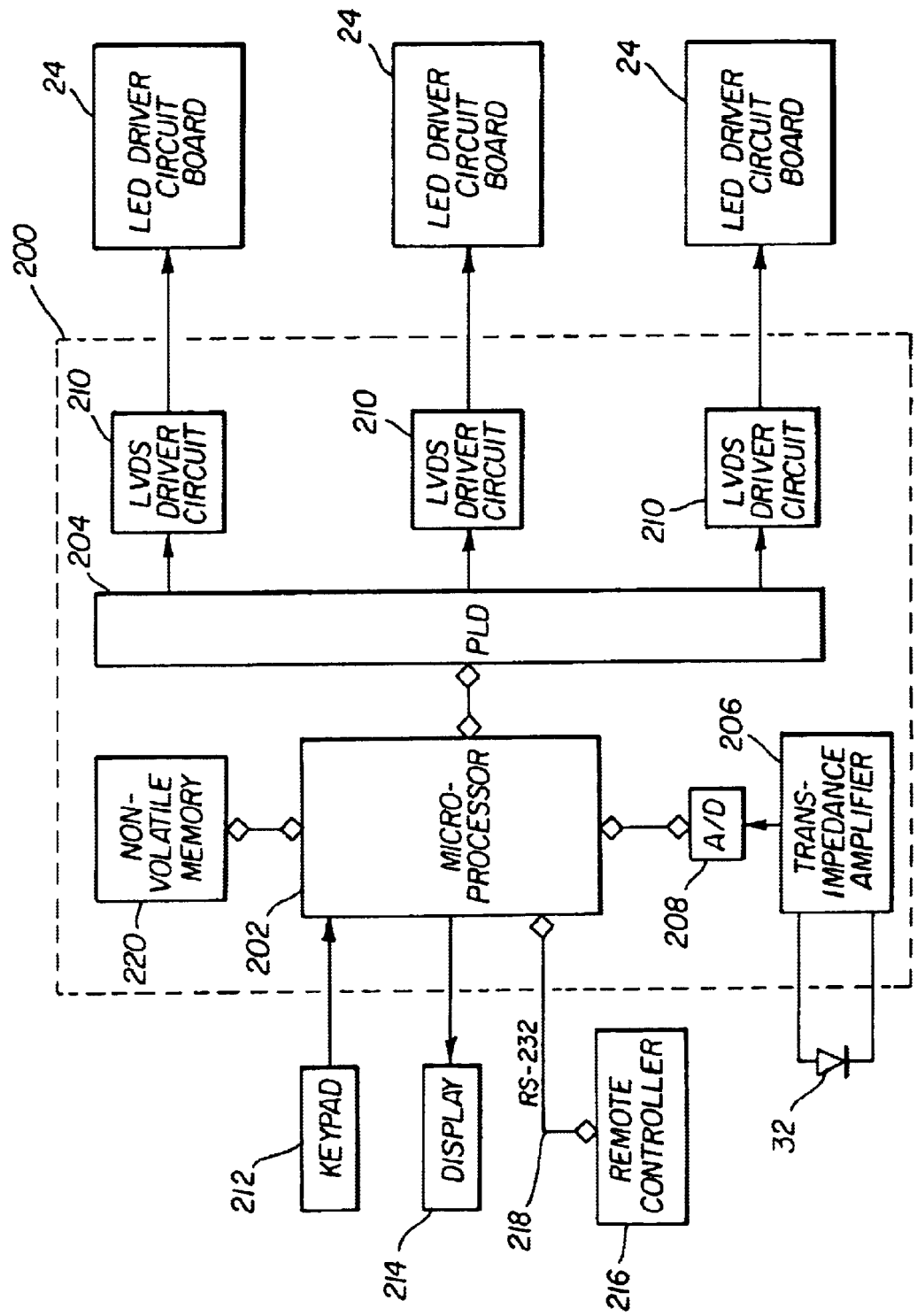
FIG. 4 is an overall functional block diagram of the LED illuminator.

Referring to FIG. 4, controller 200 provides the means of converting user-specified operating requirements into the necessary timing sequences to control the illuminator 1. In the preferred embodiment, the controller 200 is integral to the illuminator 1 and contains a microprocessor 202. The controller 200 receives user commands either via an optional keypad 212 or remotely via a digital interface 218 connected to a remote controller 216 which could, for example, be a personal computer (PC). An optional display 214 provides visual feedback to the user of the selected operating conditions. Both the keypad 212 and the display 214 could be located either within the illuminator housing or in a remote location that is more convenient for the operator. User-specified operating requirements are converted into the necessary timing and control signals by the microprocessor 202 and this information is sent to the PLD 204 for execution. Control signals from the PLD 204 are then communicated to the individual LED driver circuit boards 24 via LVDS driver circuits 210.

Referring again to FIG. 4, photodiode 32 with its associated trans-impedance amplifier 206 and analog-to-digital (A/D) converter 208 provide a means of compensating for variations in LED illuminator output level due to long-term aging as well as short-term warm up effects. The photodiode 32 produces a chamber that is directly proportional to the radiance within the spherical integrating cavity 10, in FIG. 1. A photodiode mirror block 30 is used to enable the photodiode 32 to receive radiant energy from the center of upper hemisphere 10a. The trans-impedance amplifier 206 converts the photodiode current to a voltage that is then converted to a digital value by the A/D converter 208. During calibration of the illuminator, multiple photodiode readings are taken for each individual LED while it is operated at predetermined pulse widths and forward currents. The temporal readings for each LED are averaged to mitigate the effects of noise and stored in a non-volatile memory device 220 on the controller board 200 for later use. During operation of the illuminator, photodiode readings are taken periodically for each LED channel, temporally averaged then compared to the calibration values and used to compensate for aging and warm up effects. Since an LED channel contains one or more LEDs of the same type, the calibration values for the individual LEDs used are summed together to arrive at the calibration value for the LED channel.

Skilled artisans will appreciate that the photodiode feedback circuit can be used to sense when an LED fails to operate. Immediately following power up of the illuminator, a self-diagnostic exercises each LED individually and compares its response to the stored calibration values. When a particular LED fails to operate at all, or produces a response below a predetermined threshold, it is excluded from use during operation of the illuminator. Fault-tolerant algorithms compensate for the missing LED and allow for continued operation until the LED can be replaced.

Figure 5A:
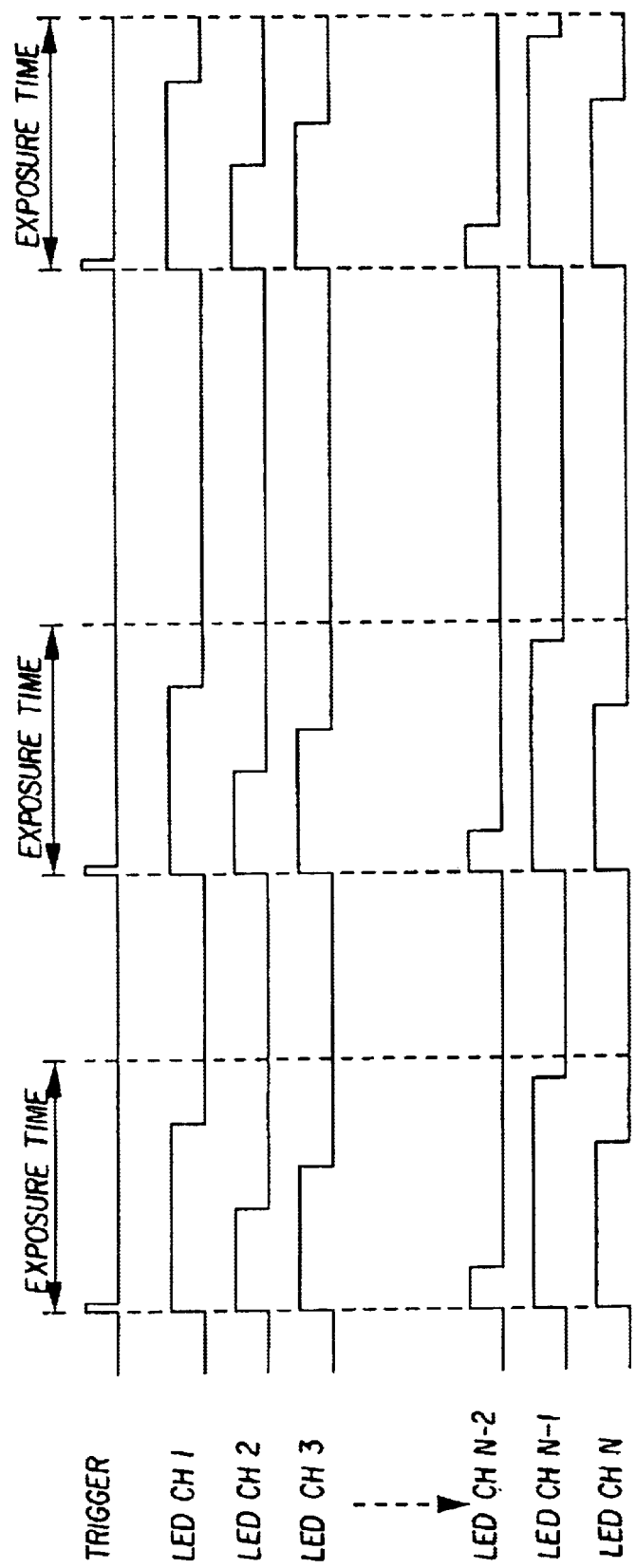
FIGS. 5a, 5b and 5c are timing diagrams illustrating the PWM outputs during the single-shot, repetitive, and gated operating modes.
Figure 5B:
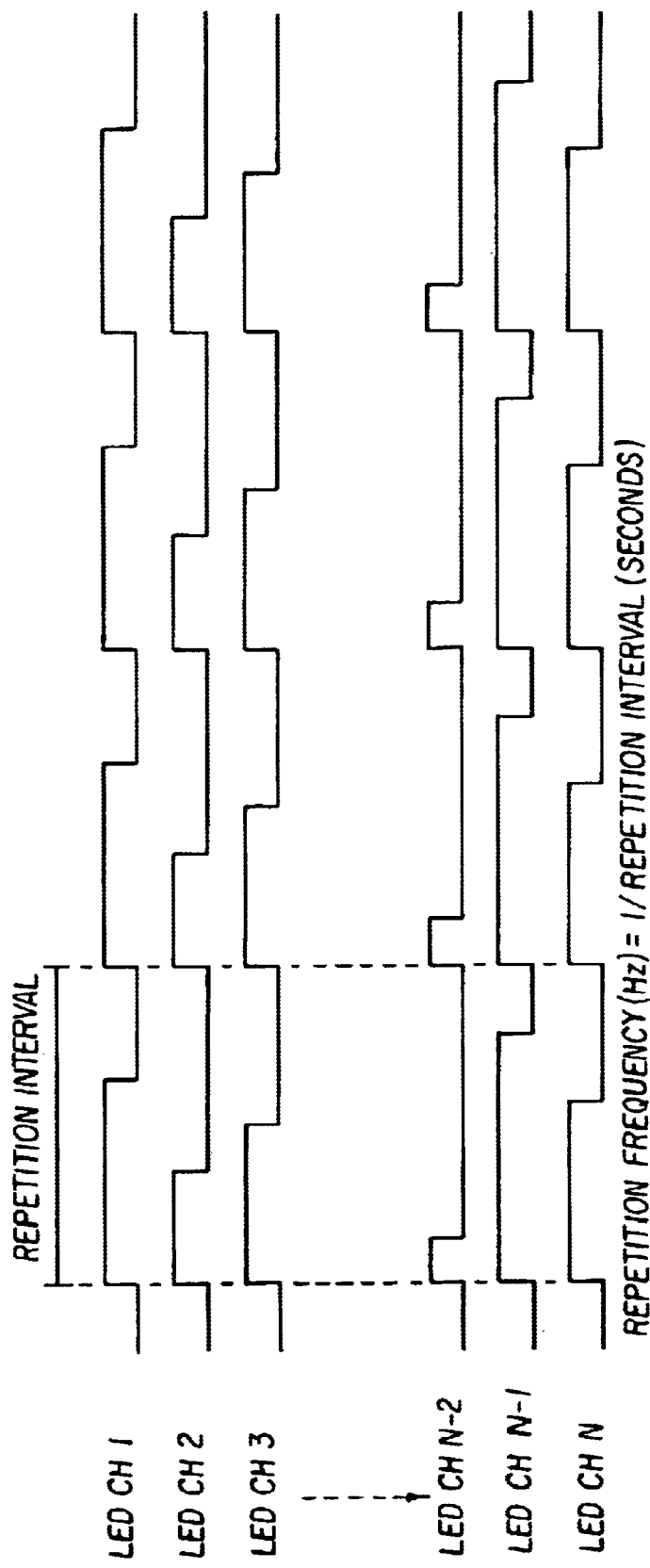
Figure 5C:
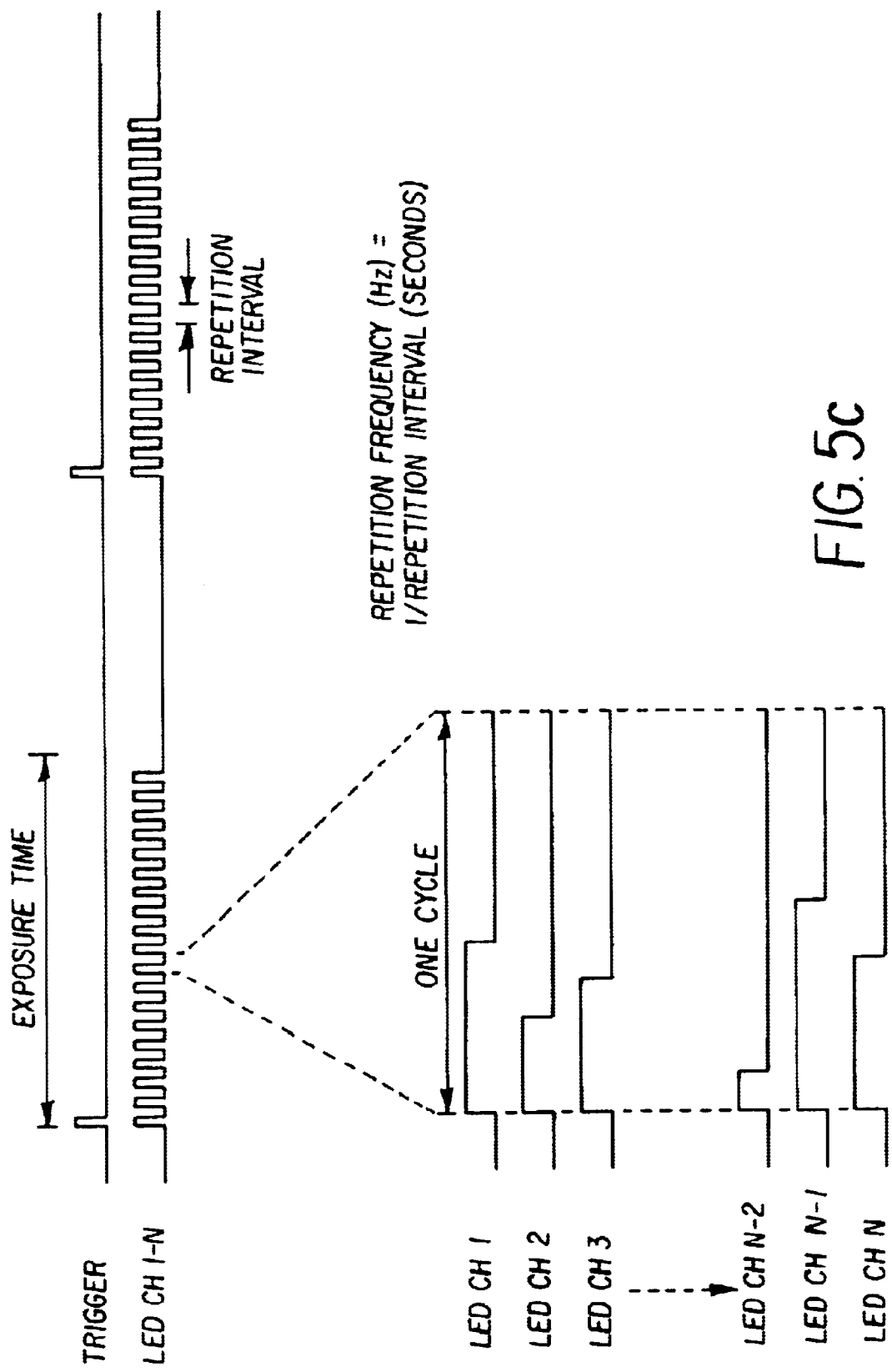

Referring to FIGS. 5a–5c, three of the four operating modes of illuminator 1 are illustrated. According to FIG. 5a, in the single-shot mode, the relative on-times for the individual LED channels 1 through M (where M is the number of LED channels available) are adjusted to achieve the desired output spectral shape while the absolute on-times are adjusted to achieve the desired output energy and execute within the available exposure time of the image capture device. The LED illuminator provides the desired output each time that a trigger pulse is received. Although the on-times of the individual LED channels are shown by way of example to start simultaneously following receipt of a trigger pulse, it will be understood that this is not a limitation of the present invention and that it may be preferable within the scope of the invention to stagger the on-times to limit the instantaneous current demand on the LED illuminator power supply.

A variant of the single-shot mode allows the user to define both the absolute on-times of the individual LED channels and the output energy of the LED illuminator. In this case, the illuminator algorithms may control the number of LEDs used, as well as their forward current, to meet the user-specified requirements. The single-shot mode is useful for testing of devices where synchronization of the illumination source is required.

Referring to FIG. 5b, in the repetitive mode, the relative on-times for the individual LED channels are again adjusted to achieve the desired output spectral shape but the overall on-time is adjusted to execute within the available repetition interval to achieve the desired output level. The repetition frequency is user specified. This mode is useful for testing of devices such as video cameras where the illumination source cannot be easily synchronized to the device under test. Use of a high repetition frequency for the illuminator relative to the video camera frame rate helps to ensure that frame-to-frame exposure differences are minimized.

Referring to FIG. 5c, a gated mode is illustrated, having characteristics of both the single-shot and repetitive modes. The gated mode allows the user to specify how many pulses at a particular repetition frequency to output each time a trigger signal is received.

Finally, a continuous mode (not shown) is provided for applications where the image capture device cannot be synchronized to the illuminator and also cannot tolerate a repetitive type of output. In this mode of operation, the forward current is modulated to produce the desired spectral output When the LED illuminator is calibrated, absolute SPD data (watts/sr-m$^2$-nm) for each of the individual LEDs is collected with the LEDs operated at a plurality of predetermined pulse-widths and forward currents. This SPD calibration data is stored in a non-volatile memory device 220 on the controller board 200, in FIG. 4, for later use. As was previously discussed, the photodiode readings for each individual LED are also measured and stored at this time. The absolute format of the SPD data enables accurate power output settings for the illuminator during operation.

The preferred embodiment of the LED illuminator according to the present invention computes the amount of each LED channel to use to synthesize the desired output spectral shape according to Equation (1) where a is a 1×M vector containing the coefficients which define the amount of each LED channel spectra required to match the desired SPD; LED is an M×N matrix containing the absolute SPD data (watts/sr-m$^2$-nm) for each of the M LED channels; and spd is a 1×N vector containing the desired SPD data. The variable M represents the number of unique LED types used and the variable N represents the number of wavelength samples used. For example, if the LED spectral data is measured over the range from 400 to 750 nm at 1 nm increments, then N=351. The resulting coefficients in Equation (1) are constrained to be either zero or positive. Negative coefficients are not allowed since this would represent the absorption of light by the LED. The spectral data for each LED channel is determined by adding together the spectral calibration data for each individual LED used in that channel on a wavelength-by wavelength basis.

$$a = (LED^T \cdot LED)^{-1} \cdot LED^T \cdot spd \qquad \text{Equation (1)}$$

Once the mixing coefficients are determined using Equation (1), the synthesized SPD is then found according to Equation (2) where src is a 1×N vector containing the spectral data for the synthesized SPD.

$$src = a^T \cdot LED^T \qquad \text{Equation (2)}$$

The actual pulse widths used for controlling the on-times of the LED channels are related to the coefficients found using Equation (1) according to Equation (3) where the constant k is computed to achieve the desired output level from the illuminator and the subscript 'm' refers to the LED channel (m=1 to M)

$$PWm = k \cdot am \qquad \text{Equation (3)}$$

In the repetitive mode of operation, the pulse widths are further modified by adding or deleting LEDs from a particular LED channel in order to reduce the variation in pulse widths among the channels. Minimization of the pulse width variation has the advantage of increasing the optical power range over which the illuminator can be operated while in repetitive mode. For non-critical applications, the forward current of each LED can be individually adjusted to provide another dimension of control for minimizing the pulse width variation and controlling the optical power range.

Figure 6:
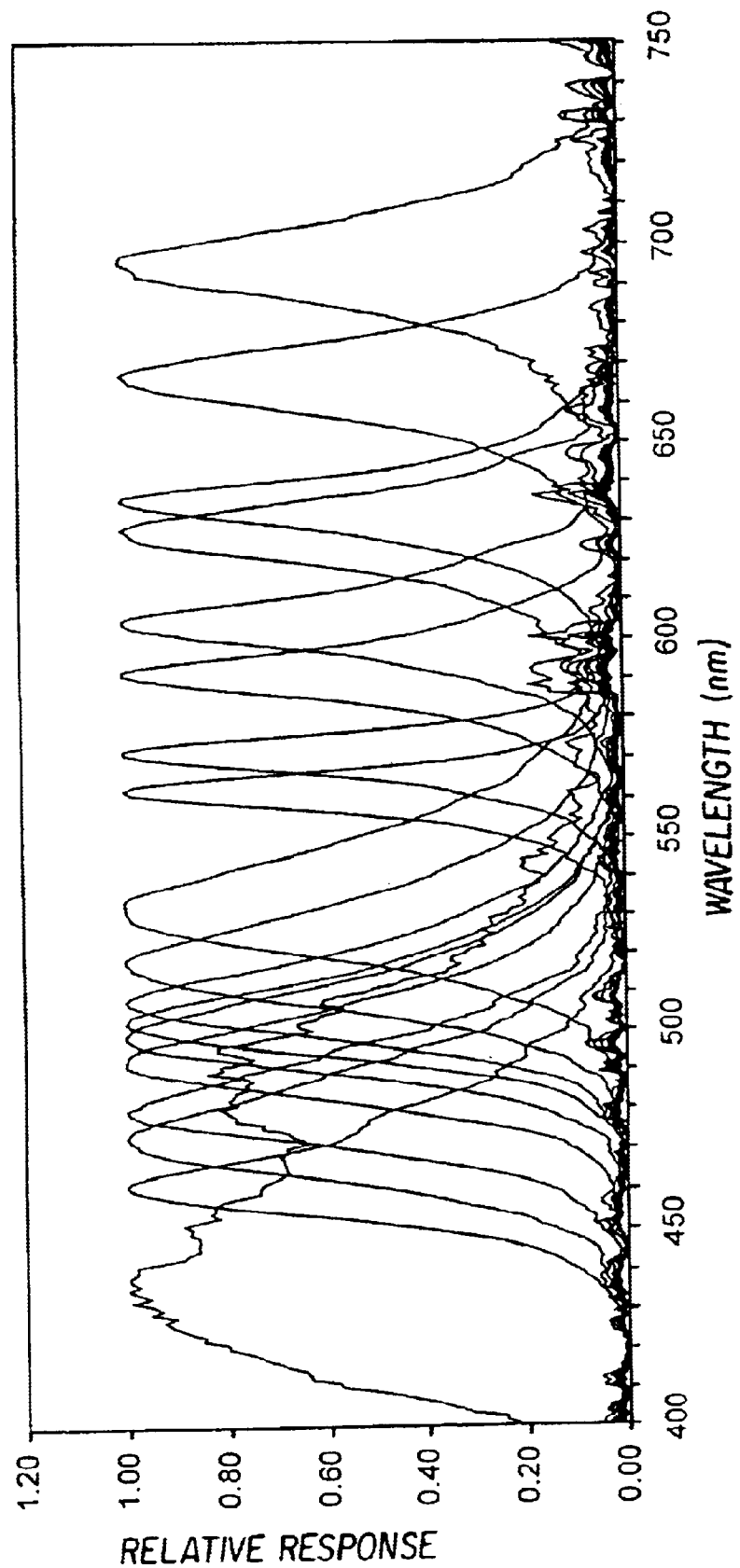
FIG. 6 is a spectral plot showing the typical relative spectral characteristics of the LEDs.

Referring to FIG. 6, the relative spectra for 18 different LED types used in the preferred embodiment are illustrated. The manufacturer and model number for these LEDs is summarized in Table 1. In some cases, multiple devices of the same type but with different suffixes have been used. The spectral data in FIG. 6 has been normalized such that the peak for each LED type has a value of unity for comparison purposes only.

Figure 7:
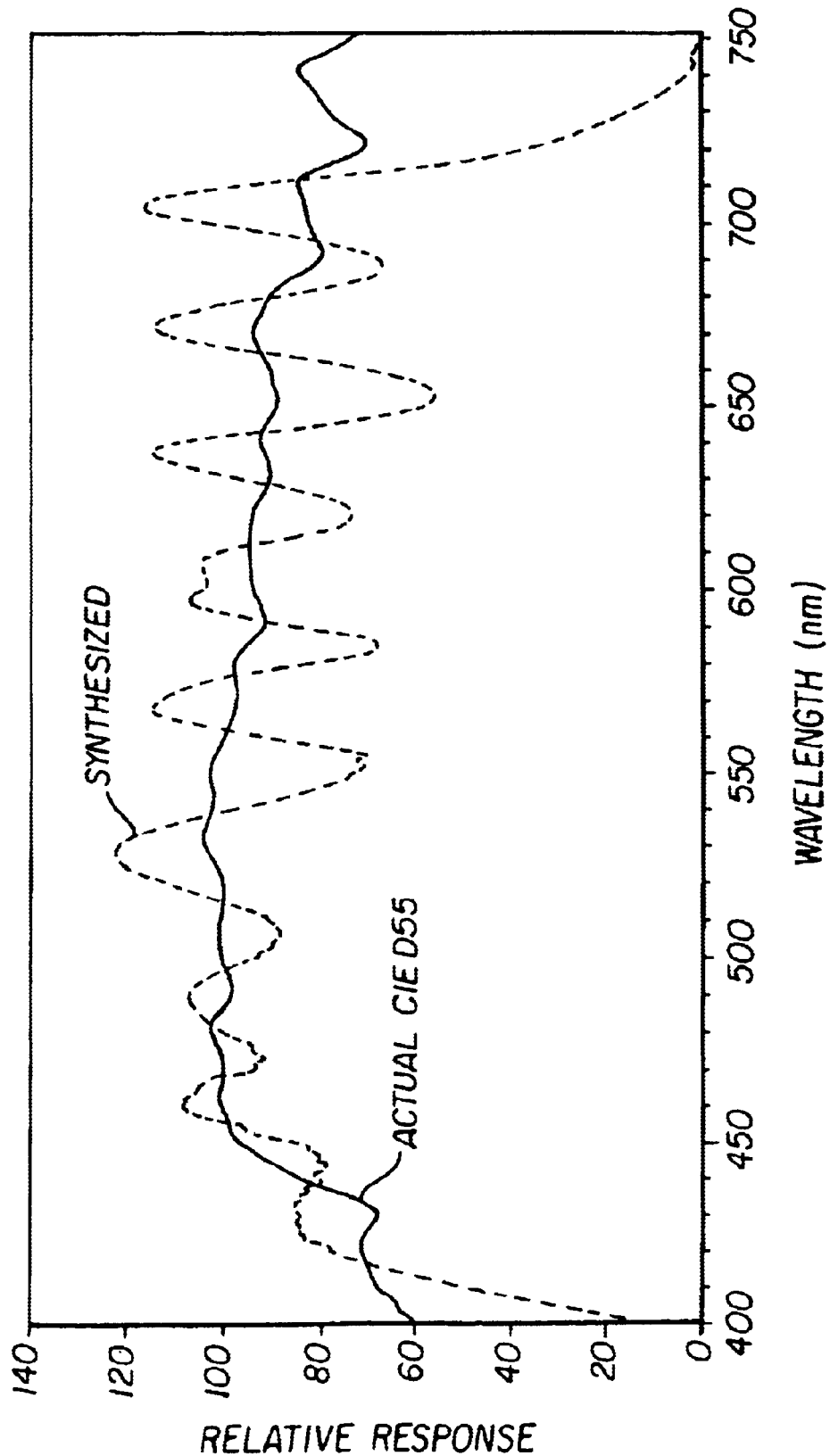
FIG. 7 is a spectral comparison of actual and synthesized versions of CIE illuminant D55.

Referring to FIG. 7, actual CIE illuminant D55 is compared with the output synthesized according to this invention using the LED spectra from FIG. 6 and Equations (1) through (3). In addition to its ability to synthesize the SPDs of various sources or illuminants, the LED illuminator can also be used to synthesize the SPDs of various object spectra when illuminated by a particular source or illuminant. This capability is useful, for example, when it is desired for the illuminator to simulate the patches of a color chart to support colorimetric calibration of an image capture device.

The invention has been described with reference to a preferred embodiment. However, it will be appreciated that variations and modifications can be effected by a person of ordinary skill in the art without departing from the scope of the invention.

Parts List:
1 illuminator
10 spherical integrating chamber
10a lower hemisphere
10b upper hemisphere
12 hemisphere coupling ring
14 energy entrance port
16 entrance port mounting flange
18 energy exit port
20 infra-red (IR) filter
22 circuit board coupler
24 LED driver circuit board
26 light emitting diodes (LEDs)
28 LED aiming block
30 photodiode mirror block
32 photodiode
100 cell
102 constant current source
104 digital-to-analog (D/A) converter
106 switch
108 programmable logic device (PLD)
110 LVDS receiver
112 OP-AMP
114 P-channel MOSFET transistor
116 resistor
200 controller
202 microprocessor
204 programmable logic device (PLD)
206 trans-impedance amplifier
208 analog-to-digital (A/D) converter
210 LVDS driver circuit
212 keypad
Parts List-continued
214 display
216 remote controller
218 digital interface
220 non-volatile memory device

What is claimed is:

1. An illuminator comprising:
   an integrating chamber having a first port having a plurality of energy inlet openings for receiving energy and a second port having a plurality of energy outlet openings arranged for transmitting energy received through said first port, said first port comprising N+2 number of said energy inlet openings arranged symmetrically about said second port, where N is an odd integer, and wherein each one of said energy inlet openings has an optical axis generally normal to an optical axis of said second port;
   an energy emitting means arranged in said first port for directing a beam of energy into said integrating chamber, said energy emitting means comprising a plurality of light emitting diodes (LED) and a circuit board operably connected to each one of said plurality of light emitting diodes (LED);
   means for supporting said energy emitting means so that emitted energy is directed along a predetermined optical path in said integrating chamber;
   means for filtering energy of a predetermined wavelength, said means for filtering energy being arranged between said energy emitting means and said integrating chamber; and,
   a controller means operably associated with said energy emitting means for receiving user commands and then transmitting said user commands to said energy emitting means thereby enabling said energy emitting means to controllably emit energy.

2. The illuminator recited in claim 1 wherein said first port comprises three energy outlet openings.

3. The illuminator recited in claim 2 wherein said energy inlet openings comprising three energy outlet openings are arranged symmetrically about said second port, each one of said energy inlet openings having an optical axis generally normal to an optical axis of said second port.

4. The illuminator recited in claim 1 wherein N is 1.

5. The illuminator recited in claim 1 further comprising a photodiode feedback circuit operably associated with said controller means for compensating for long-term aging and short-term warm-up effects of said plurality of light emitting diodes.

6. The illuminator recited in claim 1 wherein said means for filtering is an infra-red filter.

7. The illuminator recited in claim 5 wherein said photodiode feedback circuit comprises a trans-impedance amplifier and an A/D converter.

8. The illuminator recited in claim 1 wherein a coupler connects said circuit board to said first port of said integrating chamber, said coupler also providing means for securing said means for filtering.

9. The illuminator recited in claim 1 wherein each one of said plurality of light emitting diodes has a full emission angle of less than about 15 degrees.

10. The illuminator recited in claim 1 wherein said circuit board comprises means for individually driving each one of said plurality of light emitting diodes.

11. The illuminator recited in claim 10 wherein said means for individually driving comprises a constant current source programmably operated by a digital-to-analog converter.

12. The illuminator recited in claim 10 further comprising a switch operably associated with said means for individually driving for executing a pulse width modulation signal of each of said plurality of light emitting diodes, said switch, in response to said pulse width modulation signal, alternately shunting forward current around each of said plurality of light emitting diodes when each one of said plurality of light emitting diodes is in an off state, and passing said forward current through said light emitting diodes when each is in an on state.

13. The illuminator recited in claim 12 wherein said switch is one channel of an open-collector TTL driver integrated circuit, said TTL driver integrated circuit being operably associated with said controller means.

14. The illuminator recited in claim 11 wherein said constant current source comprises a P-channel MOSFET transistor.

15. The illuminator recited in claim 1 wherein said means for supporting is concave.

16. The illuminator recited in claim 1 wherein said integrating chamber is generally spherically shaped.

17. The illuminator recited in claim 1 wherein output power of each one of said plurality of light emitting diodes is controlled by pulse width modulation to said each one of said plurality light emitting diodes.

18. The illuminator recited in claim 1 wherein output power of each one of said plurality of light emitting diodes is controlled by forward current control.

19. The illuminator recited in claim 1 wherein output power of each one of said plurality of light emitting diodes is controlled by pulse width modulation in combination with forward current control to said plurality of light emitting diodes.

20. A method of making an illuminator, comprising the steps of:
- providing an integrating chamber having a first port having a plurality of energy inlet openings for receiving energy and a second port arranged for transmitting energy received through said first port, said first port comprising N+2 number of said energy inlet openings arranged symmetrically about said second port, where N is an odd integer, and wherein each one of said energy inlet openings has an optical axis generally normal to an optical axis of said second port;
- arranging an energy emitting means provided with a plurality of light emitting diodes (LED) and a circuit board operably connected to each one of said plurality of light emitting diodes in said first port for directing a beam of energy into said integrating chamber;
- supporting said energy emitting means so that emitted energy is directed along a predetermined optical path in said integrating chamber;
- filtering energy of a predetermined wavelength from entering said integrating chamber; and,
- providing a controller means operably associated with said energy emitting means for receiving user commands and then transmitting said user commands to said energy emitting means thereby enabling said energy emitting means to controllably emit energy.

21. The method recited in claim 20 wherein said step of providing an energy emitting means comprises the step of providing a circuit board comprising means for individually driving each one of said plurality of light emitting diodes.

22. The method recited in claim 21 wherein said means for providing a circuit board further comprises providing driving means comprising a constant current source programmably operated by a digital-to-analog converter.

23. The method recited in claim 22 further comprising the step of providing a switch operably associated with said means for driving for executing a pulse width modulation signal of each of said plurality of light emitting diodes, said switch, in response to said pulse width modulation signal, alternately shunting forward current around each of said plurality of light emitting diodes when each one of said plurality of light emitting diodes is in an off state, and passing said forward current through said light emitting diodes when each is in an on state.

24. The method recited in claim 20 wherein the step of providing an odd number of inlet openings includes providing three inlet openings.

25. The method recited in claim 20 wherein said step of providing an integrating chamber includes the step of preselecting a spherically shaped integrating chamber.

26. The method recited in claim 20 further comprising the step of providing a photodiode feedback circuit operably associated with said controller means for compensating for long-term aging and short-term warm-up effects of said plurality of light emitting diodes.

* * * * *